United States Patent [19]

Calvignac et al.

[11] Patent Number: 5,530,903
[45] Date of Patent: Jun. 25, 1996

[54] SYSTEM FOR REASSIGNING A HIGHER PRIORITY TO AN INTERRUPTED USER BY INHIBITING THE ACCESS OF OTHER USERS UNTIL THE INTERRUPTED USER HAS COMPLETED ITS TASK

[75] Inventors: Jean Calvignac; Philippe Cuny, both of La Gaude; Philippe Klein; Jean-Pierre Lips, both of Cagnes-Sur-Mer; Oliver M. Maurel, Le Cannet; Bernard Naudin, Saint Laurent du Var, all of France

[73] Assignee: International Business Machines Corporation, Armonk, N.Y.

[21] Appl. No.: 36,294

[22] Filed: Mar. 24, 1993

[30] Foreign Application Priority Data

Jun. 30, 1992 [EP] European Pat. Off. ............. 92480096

[51] Int. Cl.⁶ .................................................. G06F 13/364
[52] U.S. Cl. .................... 395/861; 395/862; 395/731; 395/735; 364/230.1; 364/242.8; 364/242.9; 364/242.93
[58] Field of Search ................................ 395/200, 275, 395/550, 725; 364/200

[56] References Cited

U.S. PATENT DOCUMENTS

| | | | |
|---|---|---|---|
| 4,059,851 | 11/1977 | Nutter, Jr. et al. | 395/853 |
| 4,381,542 | 4/1983 | Binder et al. | 364/200 |
| 4,395,753 | 7/1983 | Comfort et al. | |
| 4,755,938 | 7/1988 | Takahashi et al. | 364/200 |
| 4,924,380 | 5/1990 | McKinney et al. | 364/200 |
| 5,168,568 | 12/1992 | Thayer et al. | 395/725 |

FOREIGN PATENT DOCUMENTS

| | | | |
|---|---|---|---|
| 0139568 | 5/1985 | European Pat. Off. | G06F 13/26 |
| 0239979 | 10/1987 | European Pat. Off. | G06F 13/14 |
| 0347763 | 12/1989 | European Pat. Off. | G06F 13/36 |
| 0463943 | 1/1992 | European Pat. Off. | G06F 13/362 |
| 0239279 | 7/1987 | Japan | G06F 13/14 |

Primary Examiner—Thomas C. Lee
Assistant Examiner—Marc K. Weinstein
Attorney, Agent, or Firm—John J. Timar; Edward H. Duffield

[57] ABSTRACT

The arbitrating method is based on the classification of the users into different categories, and the assignment to all users in a category of an identical privilege level which characterizes the interruption capability of the users in the category. A task performed by a selected user in a category can only be interrupted for granting access to the resource to a user in a category having a higher privilege level. Also a normal preference level is assigned to each user within a category, which determines the selection order of the users in the category. The privilege level of a user category combined with the preference level of each user constitutes the priority level of the user. The access to the resource is granted to a selected user having the highest priority level. If at least one user having a privilege level higher than the privilege level of the selected user, makes a request for the resource, the task of the selected user is interrupted and the interrupted user is assigned an interruption preference level which is higher than the normal preference levels of all other users in the category. A new user having the highest priority level is then selected after the resource is released by the interrupting user.

5 Claims, 9 Drawing Sheets

SYSTEM FOR REASSIGNING A HIGHER PRIORITY TO AN INTERRUPTED USER BY INHIBITING THE ACCESS OF OTHER USERS UNTIL THE INTERRUPTED USER HAS COMPLETED ITS TASK

FIELD OF THE INVENTION

The present invention relates to a method and an apparatus for managing the accesses to a resource such as a bus, shared by several users in a data processing system. More particularly, it relates to a method and apparatus which optimize the resource occupancy for users of different natures.

BACKGROUND ART

In data processing systems, it is common practice for different users to share a common resource such as a bus. Generally, the users are interconnected through a system bus. Each user has the capability of requesting the bus for receiving or/and sending information or requests from or to another user.

Thus, in this environment the accesses to the bus must be managed so that only one user is given access to the bus at one time.

There exist different arbitrating techniques which can be classified into two modes. In the first mode, called "fixed mode", each user is assigned a fixed priority and when the bus is free, the new bus preemption is gotten by the highest priority user requesting the bus. In the second mode, called "rotating mode", or "round-robin mode", when the bus is free, each user is granted access to the bus one by one until all pending requests are serviced. This second mode optimizes fairness between the users, but no protection against overrun conditions is provided.

European patent application 0039635 describes an arbitration system based on a hierarchical round-robin process wherein the working time is partitioned between the users which request the bus. A drawback of this system is that the users must be of the same nature and that all users are able to wait for their selection.

OBJECTS OF INVENTION

An object of the present invention is to provide an improved method and an apparatus for arbitrating among the requests for a common resource raised by users of a different nature.

Another object of the present invention is to provide such a method and apparatus suitable for the circumstance when some users do not have the capability of waiting for their resource allocations.

BRIEF DESCRIPTION OF THE INVENTION

The new method for arbitrating among requests for access to a common resource by a plurality of users in order to grant access to a selected user, includes:

a) Classifying the users in different categories, b) Assigning to all users of each category an identical privilege level which characterizes the interruption capability of the users of the category. A task performed by a selected user of a category can only be interrupted for granting access to the resource to a user of a category having the currently highest privilege level, c) Assigning to each user of each category a normal preference level which determines the selection order of the users of the category, the privilege level of the user category and the preference level of each user constituting the priority level of the user. The highest priority level is assigned to the user having the highest preference level in the category having the highest privilege level.

d) Analyzing the priority levels of the users making requests for the resource and determining the user having the highest priority level.

e) Granting access to the resource to a selected user having the highest priority level as determined at step d), until the selected user has completed its task, whereupon a new analyzing step is performed.

f) Determining if at least one user which has a privilege level higher than the privilege level of the selected user at steps d) and e) makes a request for the resource and interrupting the task of said selected user and assigning to the so-interrupted user an interruption preference level which is higher than the normal preference levels of the users in the category and selecting a new user by performing steps d) and e).

The arbitrating apparatus implements the above method steps through logical circuitry.

DETAILED DESCRIPTION OF THE INVENTION

The arbitrating apparatus according to the subject invention implements an arbitrating method which manages the access to a shared resource such as a bus, in a data processing system wherein the shared resource is accessible by users of different types.

Figure 1:
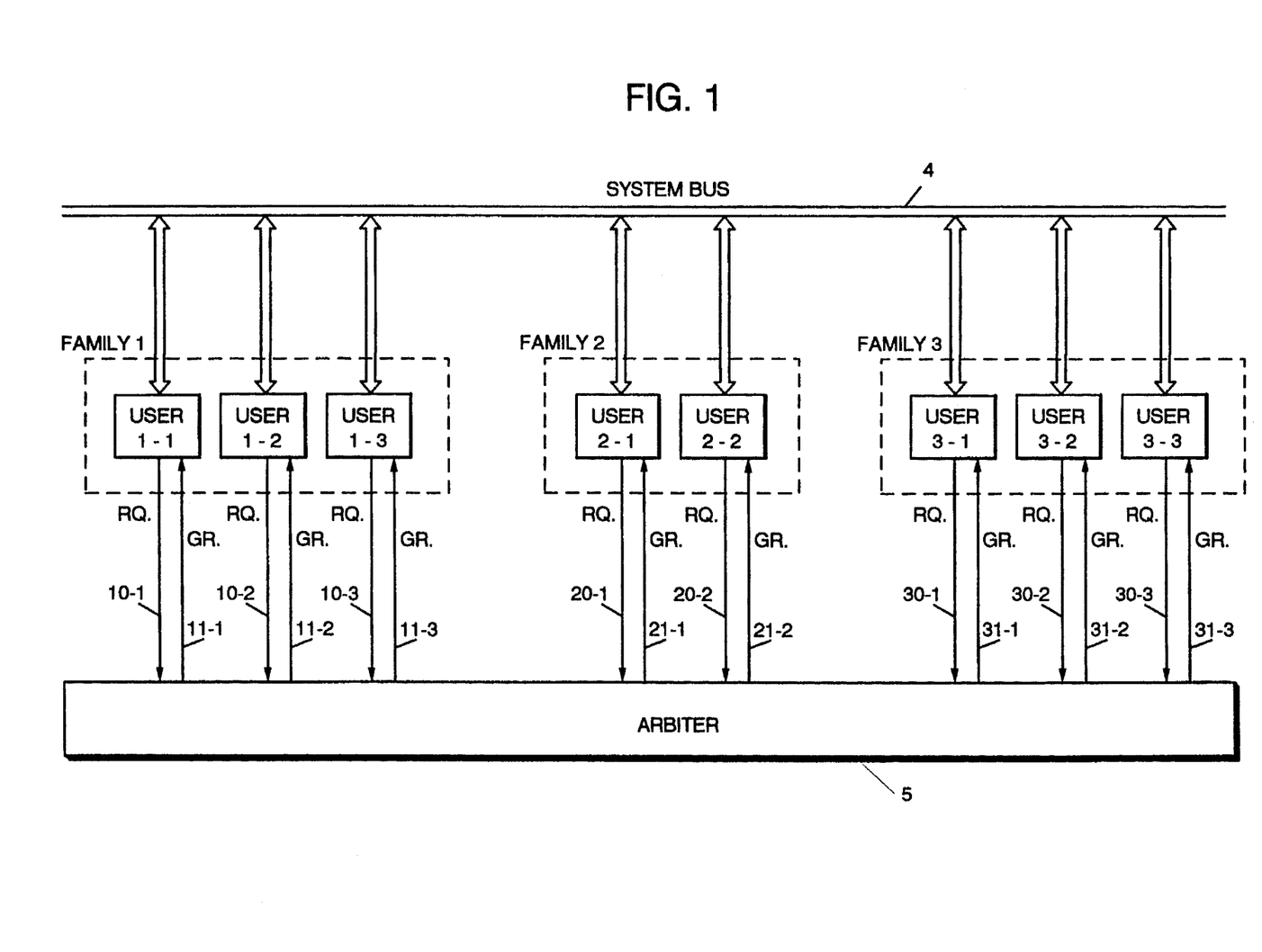
FIG. 1 represents the general arrangement of users sharing a common bus and of their classification in different families.

Such a system is schematically represented in FIG. 1. As shown in this figure, the users are classified into different families. For example, the family 1 comprises the users 1—1, 1-2, 1-3, the family 2 comprises the users 2-1 and 2—2 and the family 3 comprises users 3-1, 3-2 and 3—3. The users have access to a common bus 4, the bus accesses are arbitrated by arbiter 5 which is arranged in a star configuration, which means that each user is connected to the arbiter by a request RQ line and a grant GR line. The RQ lines and grant GR lines of the users of the families 1, 2, 3 are referenced by the numbers 10, 20, 30 and 11, 21, 31 respectively. These numbers are followed by a suffix 1, 2 or 3 corresponding to the users 1, 2, or 3 within the family. A user which requests an access to the bus raises a signal on its request line (for example by setting this line to a "1" level) and the arbiter processes the requests, selects the request of a user as will be described below on and raises the grant line (for example by setting this line to a "1" level") of the selected user which is the bus master user.

Each user is assigned a privilege level and a normal preference level. The privilege level is an attribute of each user which characterizes its capability of interrupting the bus master user. The privilege level allows a user which raises a request to immediately interrupt the task of the current bus master user if the privilege level of the current bus master user is lower than the one of the user.

The normal preference level is another user attribute which allows the arbiter to solve the arbitration problem between requests having the same privilege level.

The privilege level and preference level define a priority level for each user. At any time, all active request inputs to the arbiter 5 can be classified by priority level.

The users pertaining to the same family have the same privilege level and different normal preference level. For example the privilege level of the users pertaining to family 1 is the highest level, which means that the family 1 users are not interruptible and the users pertaining to family 3 have the lowest privilege level which means that the family 3 users may be interrupted by requests raised by the family 1 and family 2 users.

Also, within each family, user 1 has a normal preference level higher than the ones of users 2 and 3, so that the arbitration within each user family is made according to that level.

According to the invention, a bus master user is not interruptible by a user pertaining to the same family. It is only interruptible if a request is raised by a user pertaining to a family having a higher privilege level.

When a user is interrupted, an interruption preference level which is higher than the normal preference levels of the family users is automatically assigned to it, so that the interrupted user will be selected when the interrupting user has completed its task, and when there is no other request raised by users in families of higher privilege level, thus there is no need to save the context of an interrupted user.

Briefly, the main features of the subject invention are the following:

The arbitration bus is arranged in a star distribution with one request and grant line pair per user. There are as many interruption levels as there are different user families. A standard arbitration is made within each user family based on the normal or interruption preference level of the users. The interruption order of a user is made by releasing the grant line of the user under control of the arbiter while its request line is still set to 1. On the other hand, at the end of a normal sequence, the user resets its request line to 0 while its grant line remains set to 1, and there is an immediate reallocation of the bus to another user.

The interrupted tasks context is protected by memorizing each interrupted user, and automatically allocating the interruption preference level to the interrupted user.

The apparatus for implementing this arbitration scheme is shown in FIGS. 2, 3, 4 and 5 and will be described hereafter.

Figure 2:
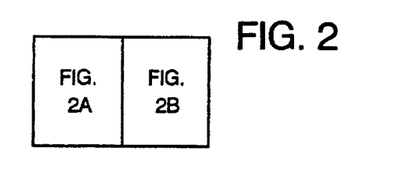
FIG. 2 represents the detailed implementation of the arbiter part processing the requests originating from the user family 1.
Figure 2A:
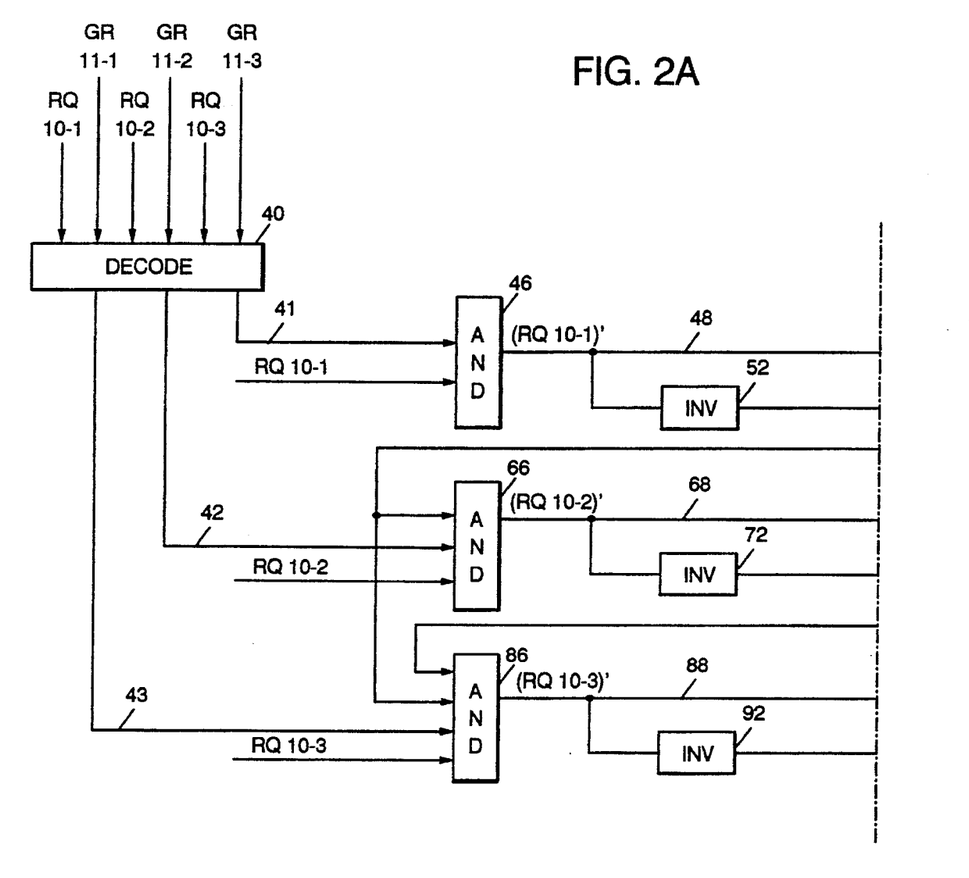
Figure 2B:
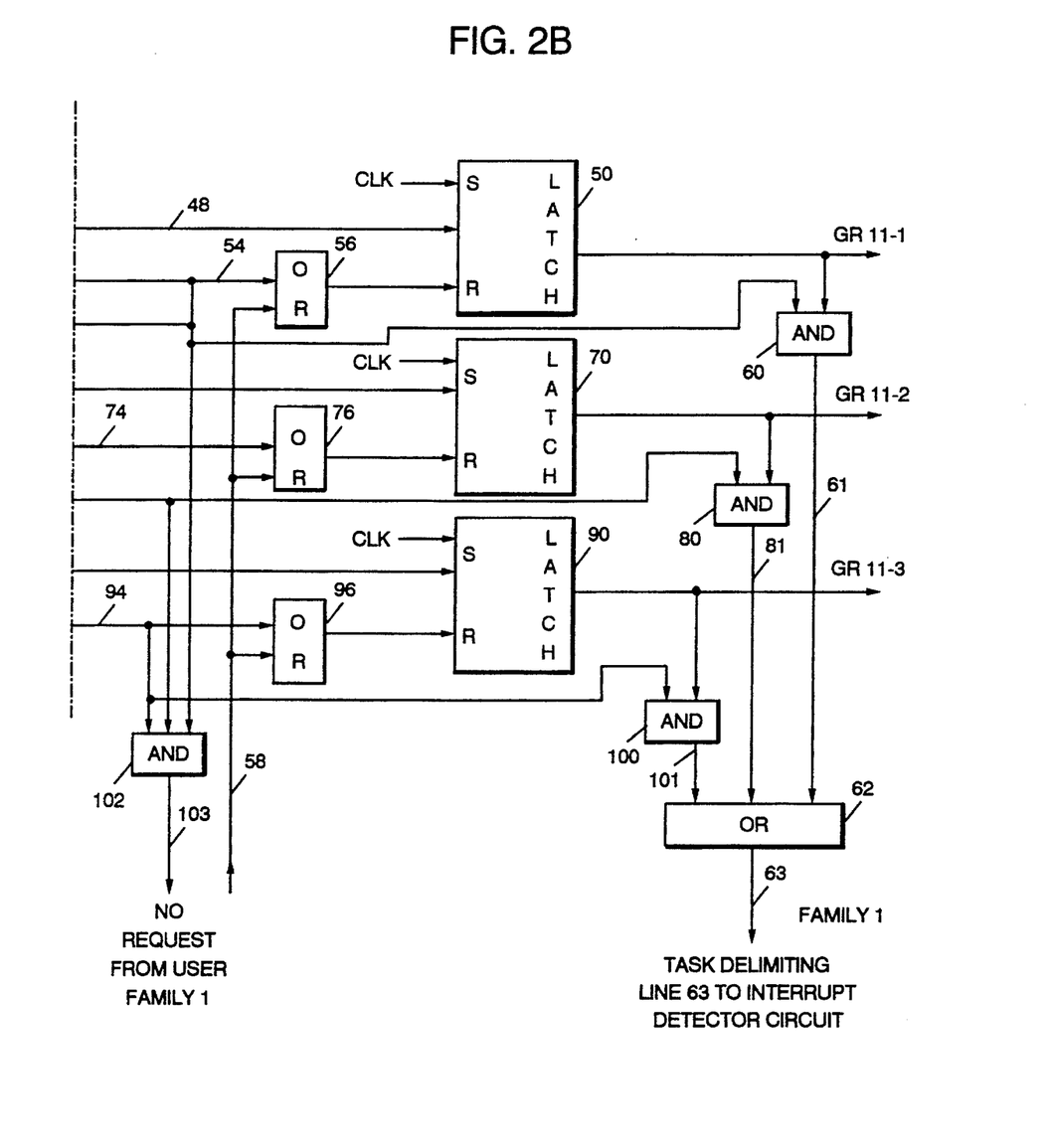

FIG. 2 represents the arbitration circuit part processing the requests of user family 1.

The request and grant lines 10-1 to 10-3 and 11-1 to 11-3 are provided to a decode circuit 40 which activates (set to 1) one of the three output lines 41, 42, 43. Line 41 is set to 1, when neither user 1-2 nor user 1-3 is master of the bus, i.e. when the following condition is met:

(RQ 10-2=0 AND GR 11-2=0) AND (RQ 10-3=0 AND GR 11-3=0)

This line 41 is provided to the input of AND gate 46, the second input of which is connected to the request line RQ 10-1. Thus, when line 41 is set to 1 and user 1—1 raises its request line RQ 10-1, the output signal on line 48, referenced (RQ 10-1)' is set to 1, which sets latch 50. The output line of latch 50 is the line GR 11-1, thus this line is activated, which means that the bus is granted to user 1—1 when user 1—1 requests the bus and no user with the same privilege level is master of the bus.

Line 48 is provided to inverter 52 which provides a signal set at 1 on its output line 54 when the user 1—1 resets to 0 its request line. This line 54 is provided through OR circuit 56 to the reset input of latch 50, which is thus reset in response thereto, so that the grant line 11-1 is released when the user 1—1 has completed its task.

Figure 4:
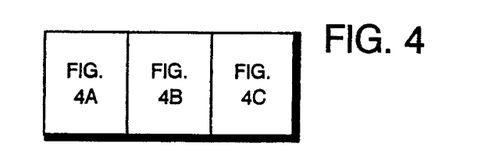
FIG. 4 represents the detailed implementation of the arbiter part processing the requests originating from the user family 3.
Figure 4A:
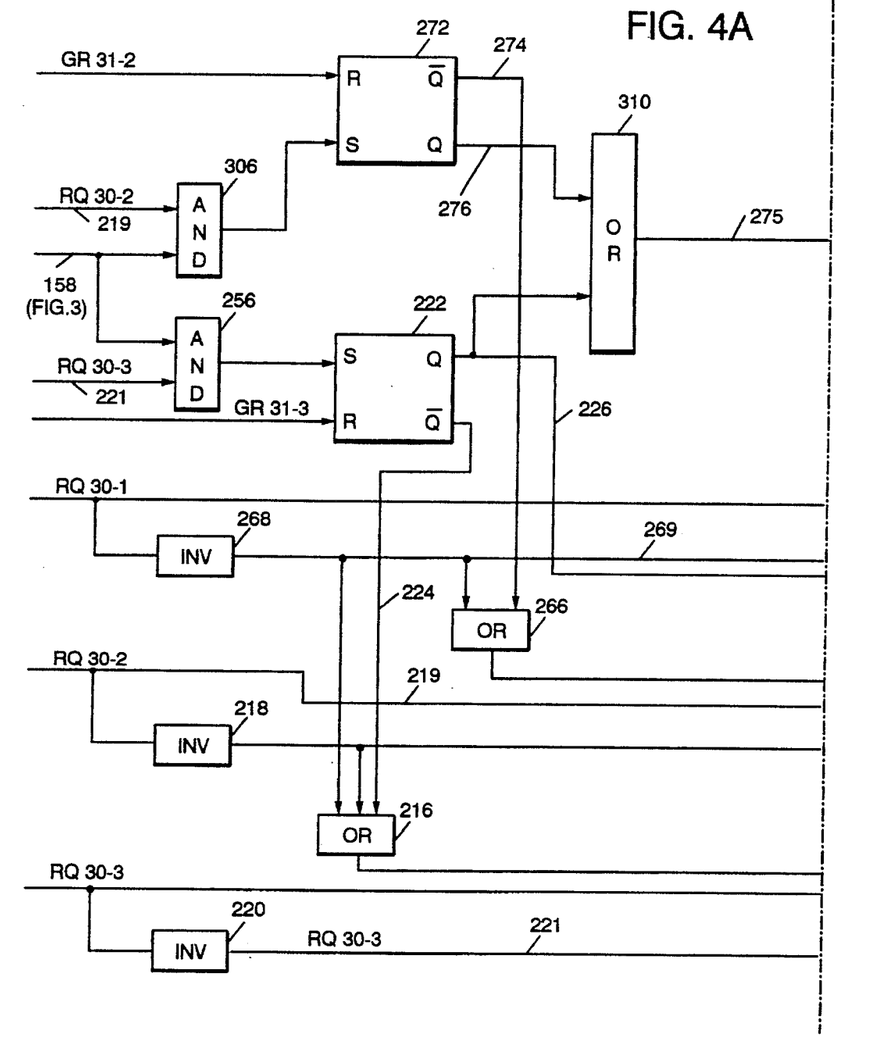
Figure 4B:
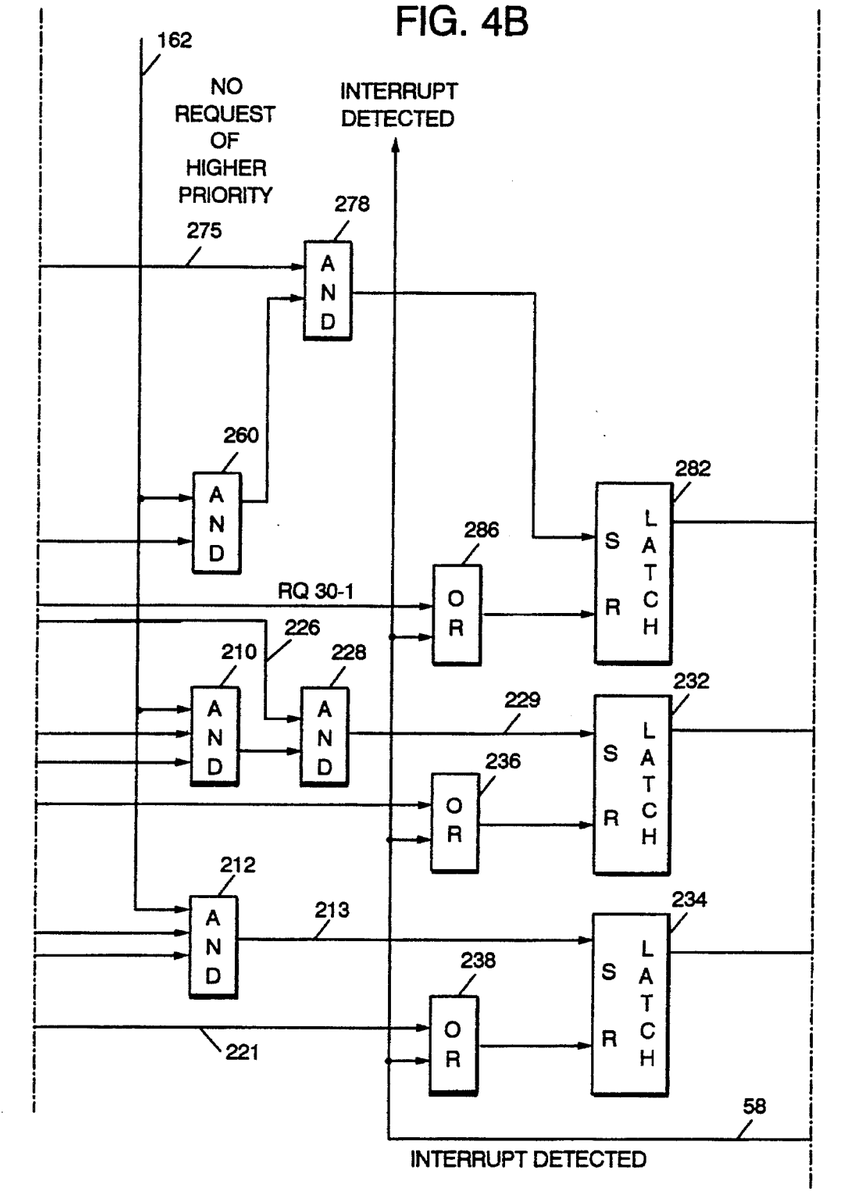
Figure 4C:
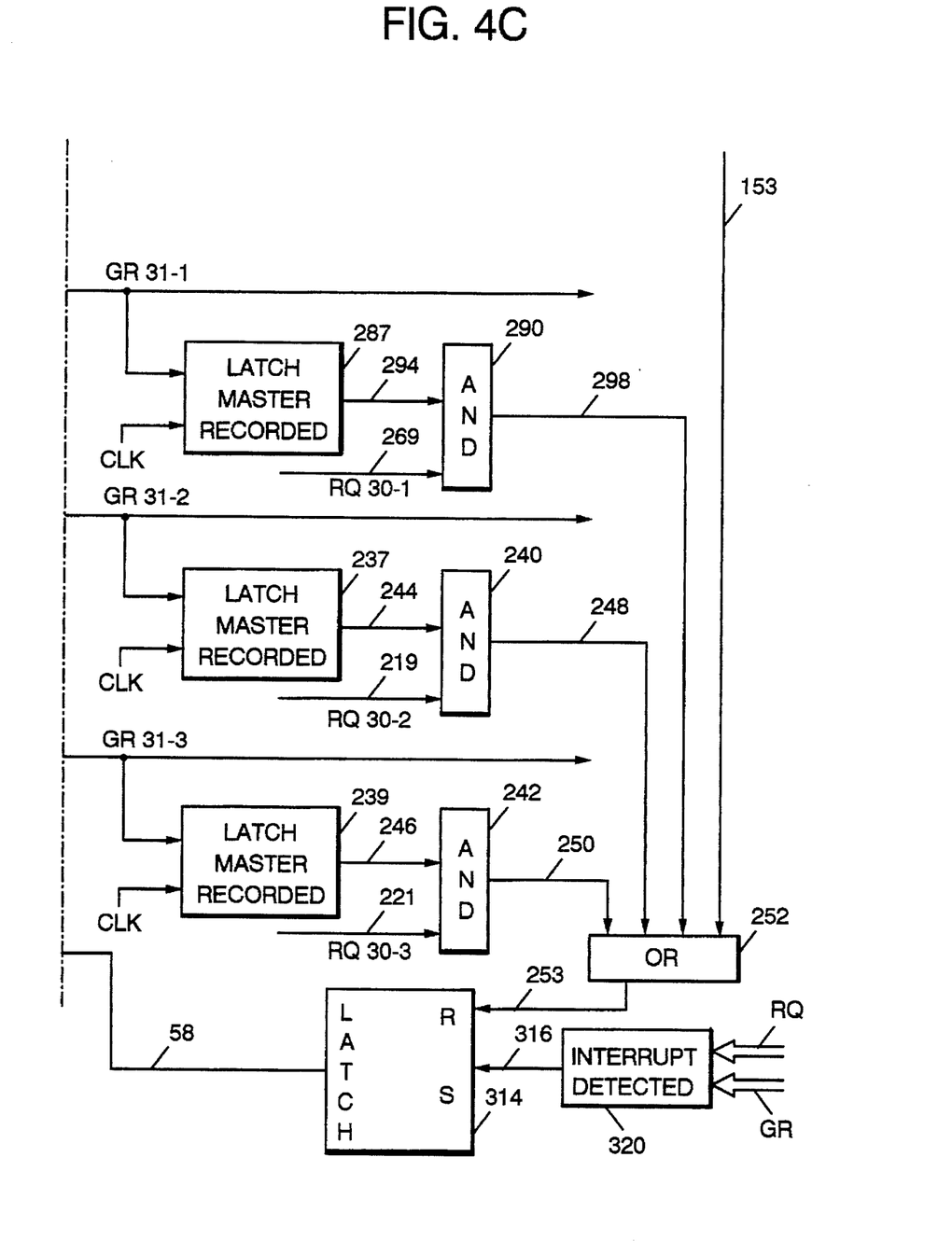

The second input of OR circuit 56 is line 58 which is the output line of an interruption order detector circuit shown in FIG. 4. This line is set to 1 by the interruption order detector when an interrupt condition is detected, in order to release all the grant lines. It is then set to 0, when the bus may be re-allocated, as will be described below.

Line GR 11-1 and line 54 are provided to the inputs of AND gate 60, the output line of which 61 is provided to OR circuit 62.

Line 42 is set to 1, when neither user 1—1 nor user 1-3 is master of the bus, i.e. when the following conditions are met:

(RQ 10-1=0 AND GR 11-1=0) AND (RQ 10-3=0 AND GR 11-3=0)

This line 42 is provided to the input of AND gate 66, the second input of which is connected to the request line RQ 10-2, and the third input of which is connected to the output line 54 of inverter 52. Thus, when lines 42 and 54 are set to 1 and user 1-2 raises its request line RQ 10-2, the output signal on line 68, referenced (RQ 10-2)' is set to 1, which sets latch 70. The output line of latch 70 is the line GR 11-2, thus this line is activated, which means that the bus is granted to user 1-2 when user 1-2 requests the bus and no user with the same privilege level is master of the bus, and user 1—1 which has a higher preference level has not raised its request line.

Line 68 is provided to inverter 72 which provides a signal set at 1, on its output line 74 when the user 1-2 resets to 0 its request line. This line 74 is provided through OR circuit 76 to the reset input of latch 70, which is thus reset in response thereto, so that the grant line 11-2 is released when the user 1-2 has completed its task.

The second input of OR circuit 76 is line 58, for the same purpose as described before for OR circuit 56.

Line GR 11-2 and line 74 are provided to the inputs of AND gate 80, the output line of which 81 is provided to OR circuit 62.

Line 43 is set to 1, when neither user 1—1 or 1-2 is master of the bus, i.e. when the following conditions are met:

(RQ 10-1=0 AND GR 11-1=0) AND (RQ 10-2=0 AND GR 11-2=0)

This line 43 is provided to the input of AND gate 86, the second input of which is connected to the request line RQ 10-3 and the third and fourth inputs of which are connected to the output lines 54 and 74 of inverters 52 and 72. Thus, when lines 43, 54 and 74 are set to 1 and user 1-3 raises its request line RQ 10-3, the output signal on line 88, referenced (RQ 10-3)' is set to 1, which sets latch 90. The output line of latch 90 is the line GR 11-3, thus this line is activated, which means that the bus is granted to user 1-3 when user 1-3 requests the bus and no user with the same privilege level is master of the bus, and users 1—1 and 1-2 which have preference levels higher than user 1—1 have not raised their request lines.

Line 88 is provided to inverter 92 which provides a signal set at 1, on its output line 94 when the user 1-3 resets to 0 its request line. This line 94 is provided through OR gate 96 to the reset input of latch 90, which is thus reset in response thereto, so that the grant line 11-3 is released when the user 1-3 has completed its task.

The second input of OR gate 96 is line 58, for the same purpose as described before for OR gate 56.

Line GR 11-3 and line 94 are provided to the inputs of AND gate 100, the output line of which 101 is provided to OR circuit 62.

Lines 54, 74, 94 are provided to the inputs of AND gate 102, which thus provides a signal on its output line 103, which is set to 1 when there is no active request from user family 1.

Figures 3, 3A:
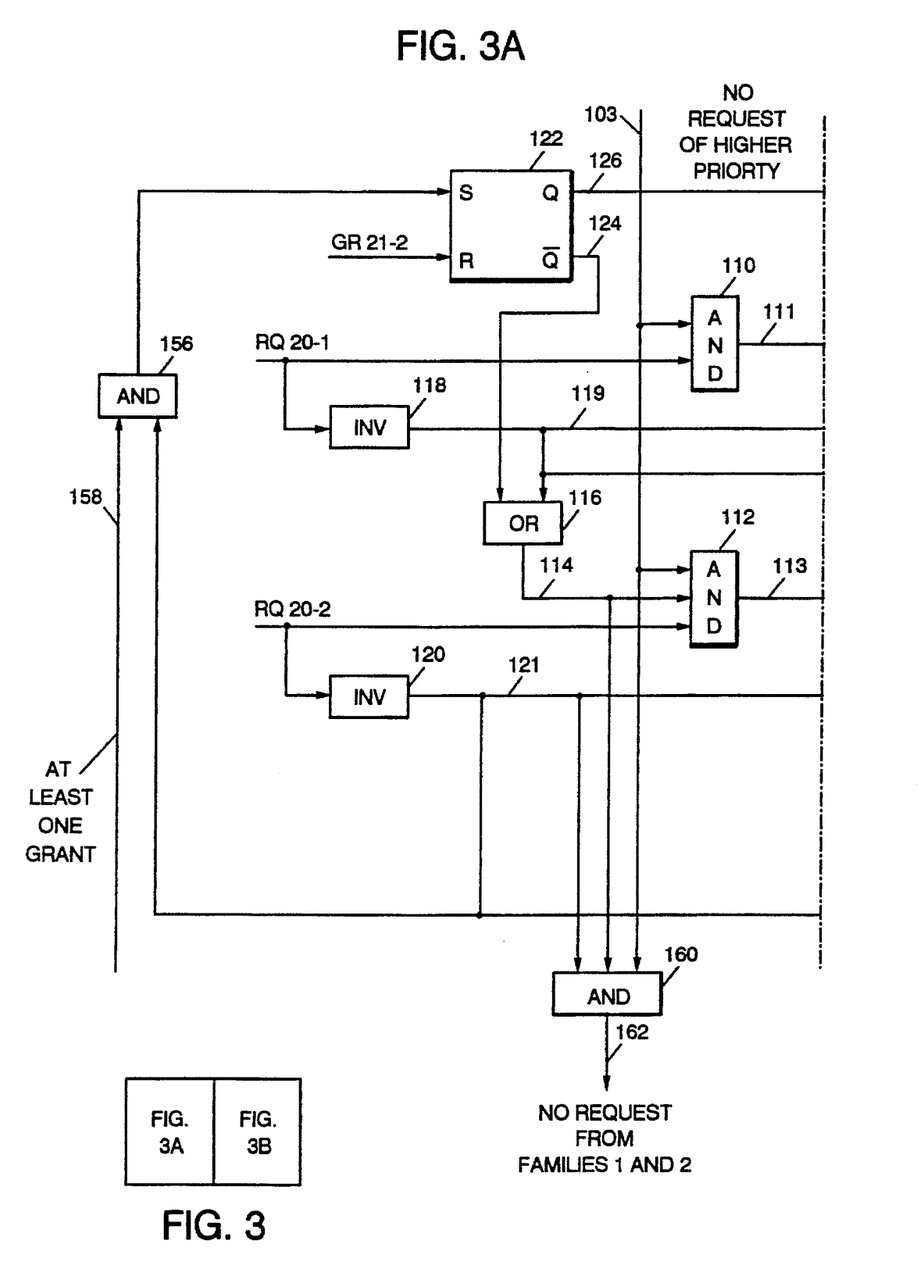
FIG. 3 represents the detailed implementation of the arbiter part processing the requests originating from the user family 2.
Figure 3B:
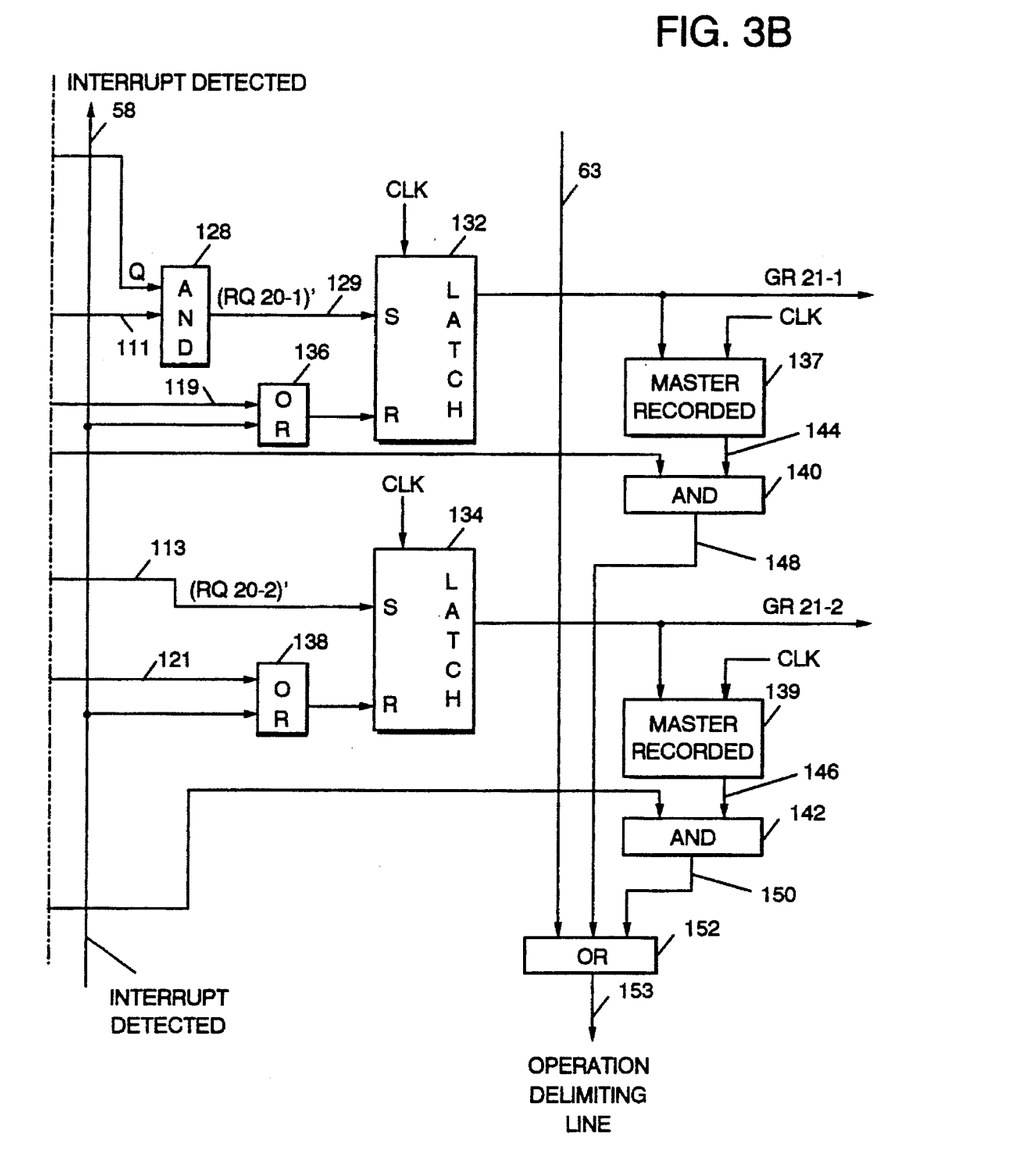

The arbitration circuit part which processes the requests from the user family 2 is shown in FIG. 3.

The two request lines from users 2-1 and 2—2 are provided to one input of AND gates 110 and 112, the second input of which is connected to line 103, which provides a signal set to 1 to these inputs when there is no higher priority requests raised by the users in family 1.

AND gate 112 has a third input line 114, which is the output line of OR circuit 116. The input lines of OR circuit 116 are the output line 119 of inverter 118, which inverts the signal on its input line RQ 20-1, and one output line 124 of an inhibition circuit 122, the function of which is to give user 2—2 the interruption preference level when this user has been interrupted to give access to the bus to a user of family 1. To implement that function, the inhibition circuit 122 has a second output line 126, which is provided to one input of AND gate 128, the second input of which is the output line 111 of AND gate 110.

Thus, the output lines of AND gates 128 and 112 provide the set control signal (RQ 20-1)' and (RQ 20-2)' to the set input of latches 132 and 134 respectively. When these latches are set they provide the active grant signals on their output lines GR 21-1 and GR 21-2, respectively.

The reset inputs of latches 132 and 134 are connected to the output lines of OR circuits 136 and 138. The input lines of OR circuit 136 are lines 119 and 58 and the input lines of OR circuit 138 are the output line 121 of inverter 120 which inverts the signal from line RQ 20-2 and line 58. Thus the latches 132 and 134 are reset either when an interrupt is detected, or when the request lines RQ 20-1 and RQ 20-2 are set to the 0 level.

The status of the grant lines GR 21-1 and 21-2 is recorded in MASTER RECORDED latches 137 and 139, i.e.; when latches 132 and 134 are set, their "1" output levels are recorded into latches 137 and 139 at the next clock pulse. Then, when an interrupt is detected, line 58 is raised which resets latches 132 and 134 and releases the grant lines GR 21-1 or GR 21-2, as the case may be. As a result, the interrupted user, which prior to the release of its grant line, was using the bus, completes its pending operation, and releases its request line for one clock cycle and posts a new request on its request line to compete for the next bus re-allocations. The interrupted user enters in a Wait status. Inverter output lines 119 and 121 are provided to the inputs of AND gates 140 and 142, together with the output lines 144 and 146 of the latches 137 and 139, so that during the one clock cycle, when the interrupted user 2-1 or 2—2 releases its request line, AND gate 140 or 142 provides an "1" output level on output line 148 or 150 which is provided to OR circuit 152 with line 63 from FIG. 2. Thus circuit 152 generates a "1" output level signal which delimits the operation completion of the interrupted user.

The inhibit circuit 122, comprises a latch which is reset by the "1" level signal on grant line GR 21-2 and is set by the "1" level signal at the output of AND gate 156. The inputs to AND gate 156 are line 121 and line 158 which is set to "1" when there is at least one grant line GR 11-1 to 11-3, 21-1 or 21-2 or 31-1 to 31-3 set to 1. Thus, when an interruptible user which does not have the highest normal preference level in its family, has completed its task, i.e. does not need access to the bus anymore, it deactivates its request line, thus if this interruptible user were 2—2, line 121 is at a "1" level while its grant line GR 21-2 is still activated, latch 122 is set and its Q output 126 is set to 1 which allows the normal selection arbitration process to be conducted, because AND gate 128 is conditioned.

As far as the grant line 21-2 of user 2—2 is activated, which means that the bus is allocated to an interruptible user which does not have the highest preference level, latch 122 is reset so that its inverted Q output 124 is set to 1, and its Q output 126 is set to 0, which gives user 2—2 the interruption preference level, to have this user selected when the interrupting user has completed its task, even if a user in the family with a higher normal preference level has raised its request line (i.e. user 2-1). At that time, the "1" level signal provided from line 124 is applied to AND gate 112 via OR circuit 116, which masks the potential "0" level on the request inverted line 119.

The two inverted request lines 121, 114 and line 103 are provided to an AND gate 160, which generates a "1" output level signal on its output line 162, when there is no request from users of families 1 and 2.

The part of the arbitration circuit processing the requests from the interruptible users of family 3 is shown in FIG. 4.

This part only differs from the part shown in FIG. 3 by the fact that the family of interruptible users comprise three users instead of two, so that two inhibition circuits are necessary.

The strings of circuits arbitrating between the requests of users 3-2 and 3—3 is identical to the arbitration part shown in FIG. 3, so that these circuits are numbered with the same reference numbers plus 100, for example inhibition circuit 222 has the same function as inhibition circuit 122, i.e. to give the interruptible user 3—3 the highest preference level when it has been interrupted, and prevent users 3-1 and 3-2 from being selected even if they have requests pending.

These circuits are, therefore, not described any further.

The request from user 3-1 is processed by an additional string of circuits which are referenced by the same numbers as the string processing the request from user 3-2 plus 50. The inhibition circuit 272 has for a function to condition AND gate 210 when the interruptible user request RQ 30-2 is selected, and to prevent the selection of user 3-1 having a highest preference level when user 3-2 has been interrupted.

Thus the Q output 276 of latch 272 is provided to OR circuit 310 together with the Q output of latch 222. Thus OR circuit 310 generates a "1" level output signal on its output line 275, which inhibits the selection of user 3-1, when either user 3-2 or 3—3 has been interrupted and have to be given the interruption preference level.

The output lines 298, 248, 250 of AND gates 290, 240, 242 are provided to the inputs of OR circuit 252 together with line 153, which thus provides a "1" level output signal on its output line 253 at the reset input of a latch 314. The set input of latch 314 is connected to output line 316 of interruption order detector 320, which is described in detail in FIG. 5. Thus, when an interrupt is detected, latch 316 is set and a "1" level interrupt detected signal is generated on its output line 58 which resets all latches: 50, 70, 90, 132, 134, 282, 232, 234 so that all grant lines are released, then when the interrupted user has released its request line for one clock cycle, line 253 is set to the "1" level and the latch 314 is reset and the bus can be re-allocated to a higher priority user, which may, by the way be different from the initial interrupting user if users having priorities higher than the priority of the initial interrupting user have raised bus requests.

Figure 5:
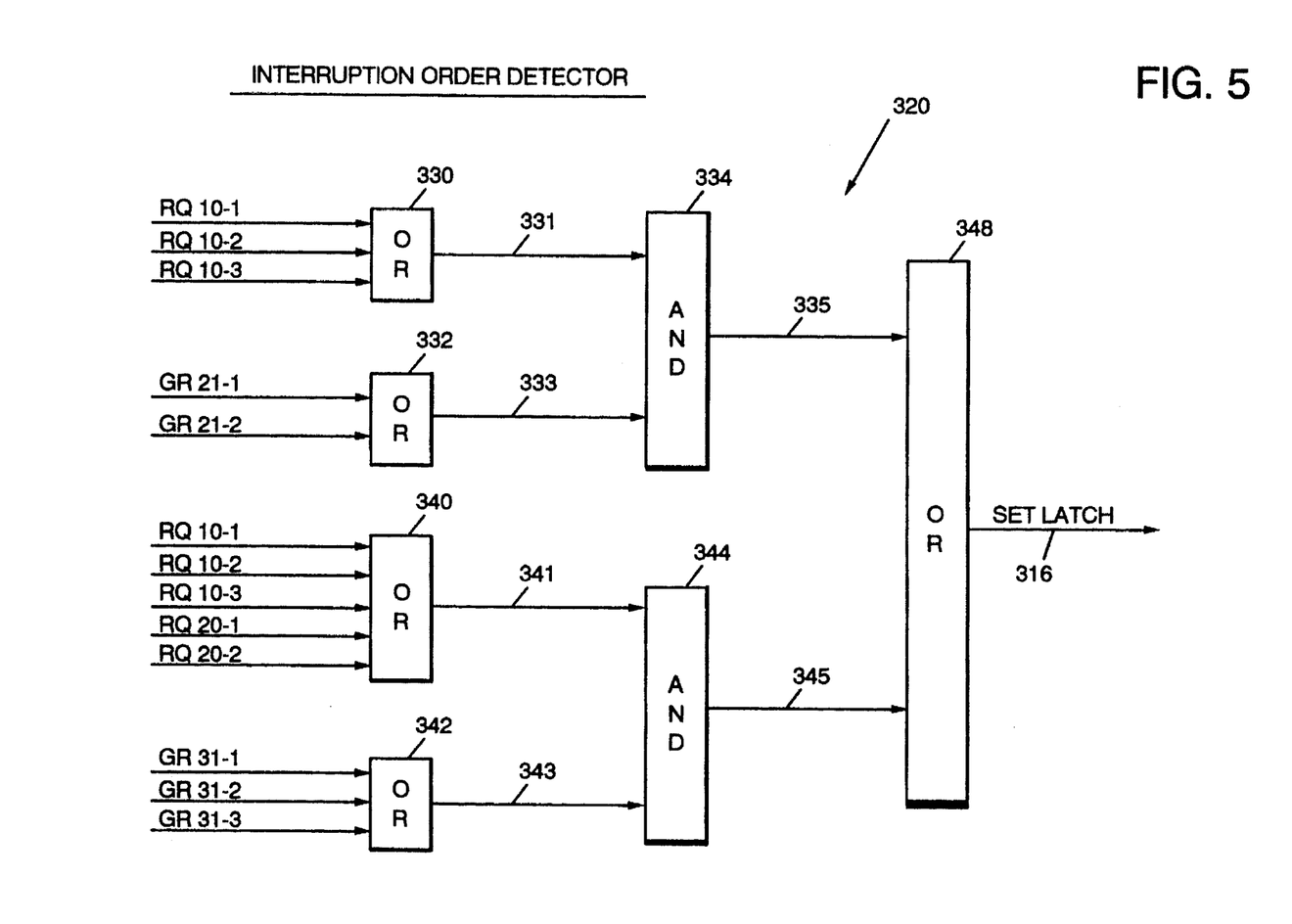
FIG. 5 represents the interruption order detector.

The interruption order detector is responsive to the request and grant signals provided on request lines RQ 10-1 to 10-3, RQ 20-1 and RQ 20-2 and to the grant signals on grant lines GR 21-1 and 21-2 and 31-1 to 31-3.

This circuit is shown in FIG. 5. Lines RQ 10-1, RQ 10-2 and RQ 10-3 are provided to OR circuit 330, and the lines GR 21-1 and GR 21-2 are provided to OR circuit 332. Output lines 331 and 333 of OR circuits 330 and 332 are provided to the inputs of AND gate 334 which thus provides a "1" level signal on its output line 335 when at least one of the users of family 1 raises a request, if the bus is granted to one of the users of family 2, which has a preference level lower than family 1.

Request lines RQ 10-1, RQ 10-2, RQ 10-3, RQ 20-1 and 20-2 are provided to the inputs of OR circuit 340 and the grant lines GR 31-1, 31-2 and 31-3 are provided to the inputs of OR circuit 342. The output lines 341 and 343 of OR circuits 340 and 342 are provided to the inputs of AND gate 344. Thus, AND gate 344 provides a "1" level signal on its output line 345, when at least one of the users of families 1 or 2 raises a request, if the bus is granted to one of the users of family 3, which has a privilege level lower than families 1 and 2.

The output lines of AND gates 334 and 344 are provided to the inputs of OR gate 348, the output line of which 316 is set to a "1" level when an interrupt is detected, this "1" level signal sets latch 314.

The operation of the arbitration circuit described in reference to the FIGS. 2 to 5, gives the following advantages:

As soon as an interrupt is detected by the interruption order detector shown in FIG. 5, all grant lines are released, and a re-allocation of the bus to a user having a privilege level higher than the current master user of the bus is made when the interrupted current master user may release the bus without perturbing the task currently executed.

The highest preference level, i.e. the interruption preference level within a family is given to the interrupted user so that it is the first selected user of the family when there is no higher priority request. This prevents the interrupted user from saving its context, since it will be selected for completing its interrupted task in preference to another user of the same family.

What we claim is:

1. A method for arbitrating among requests for access to a common resource by a plurality of users in order to grant access to a selected user, said method comprising the steps of:

a) classifying each user in one of a plurality of categories, b) assigning to each user in each category an identical privilege level that is associated with said each category and that represents an interruption capability of said each user in said each category, such that a task performed by said selected user can only be interrupted to select another user in another category having a higher privilege level that has made a request for access to the resource, c) assigning to each user in each category a normal preference level which determines a selection order among said users in said each category, the privilege level of each user category when combined with the normal preference level of each user within said each category representing a priority level of said each user, a highest priority level being assigned to said user having a highest preference level in the category having a highest privilege level, d) analyzing the priority level of each user making a request for the resource and determining said user having the highest priority level, e) granting access to the resource to the selected user which is the user having the highest priority level as determined in the analyzing step, and repeating the analyzing step when the selected user has completed its task in order to determine a next selected user, f) determining if there is at least one user which has a privilege level higher than the privilege level of the selected user that has made a request for the resource and, if there is, interrupting the task of said selected user and assigning to said selected user an interruption preference level which is higher than the normal preference level of each of the users in the category and then determining a next selected user by repeating the analyzing and granting steps, and g) inhibiting access to the resource by any other user in the same category as the selected user until said selected user has completed its task.

2. The method according to claim 1, further comprising:

h) upon determining that there is at least one user having a privilege level higher than the privilege level of the selected user that has made the request for the resource, re-allocating the resource to said next selected user at a time which is set by the selected user.

3. The method according to claim 1 or 2, further comprising the step of:

i) detecting that said selected user whose task had been interrupted has completed its task and then re-assigning to said interrupted user whose task has been interrupted its normal preference level.

4. An apparatus for arbitrating among requests for access to a common resource by a plurality of users in order to grant access to a selected user, said apparatus comprising:

a request line for each user which is set to an activated status by a request from said each user when it needs access to the resource, a grant line for each user which is set in an activated status for granting access to the resource to the selected user, priority resolving means, responsive to the activated status of the request lines for determining the request line set in an activated status by the user having a highest priority level and activating the grant line of said user, interruption detecting means responsive to the activated status of the request lines and grant lines for determining if there is at least one user, having a privilege level higher than the privilege level of the selected user whose grant line is set in the activated status, that has set its request line in an activated status, to provide a control signal to the priority resolving means which in response thereto, resets the grant line of said selected user to interrupt its task and activates the grant line of said at least one user having a privilege level higher than the privilege level of said selected user, interruption level assigning means, responsive to the resetting of the grant line of said selected user by said priority resolving means, for assigning to said selected user an interruption preference level which is higher than the normal preference level of each of the users in the category, until said selected user has completed its task, wherein the interruption level assigning means comprises inhibition means, which are responsive to the resetting of the grant line of said selected user, for generating inhibition control signals that are provided to the priority resolving means, for preventing the activation of the grant line of any other user in the same category as said selected user until said selected user has completed its task.

5. The apparatus according to claim 4 wherein the interruption level assigning means further comprises end of task detecting means for generating an end of task control signal that is provided to the priority resolving means when said selected user deactivates its request line in order to reassign to said selected user its normal preference level.

* * * * *